(12) United States Patent
Ayanam et al.

(10) Patent No.: US 8,742,717 B2
(45) Date of Patent: Jun. 3, 2014

(54) METHOD AND APPARATUS TO HARNESS KEYBOARD STROKES AND MOUSE MOVEMENT TO CHARGE AN ELECTRICAL STORAGE DEVICE

(75) Inventors: Varadachari Sudan Ayanam, Suwanee, GA (US); Baskar Parthiban, Johns Creek, GA (US)

(73) Assignee: American Megatrends, Inc., Norcross, GA (US)

( * ) Notice: Subject to any disclaimer, the term of this patent is extended or adjusted under 35 U.S.C. 154(b) by 560 days.

(21) Appl. No.: 13/095,455

(22) Filed: Apr. 27, 2011

(65) Prior Publication Data

US 2012/0274267 A1    Nov. 1, 2012

(51) Int. Cl.
H02J 7/00    (2006.01)
(52) U.S. Cl.
USPC ................................ 320/101; 320/136
(58) Field of Classification Search
USPC .................................. 320/101, 138
See application file for complete search history.

(56) References Cited

U.S. PATENT DOCUMENTS

| | | | |
|---|---|---|---|
| 5,768,568 A | 6/1998 | Inui et al. | |
| 6,356,965 B1 | 3/2002 | Broyles et al. | |
| 6,385,682 B1 | 5/2002 | Emerson et al. | |
| 6,490,637 B1 | 12/2002 | Shih | |
| 6,496,858 B1 | 12/2002 | Frailong et al. | |
| 6,560,704 B2 | 5/2003 | Dieterman et al. | |
| 6,792,479 B2 | 9/2004 | Allen et al. | |
| 7,605,689 B2* | 10/2009 | Hein et al. | 340/426.15 |
| 7,856,549 B2 | 12/2010 | Wheeler | |
| 8,115,448 B2* | 2/2012 | John | 320/108 |
| 8,362,745 B2* | 1/2013 | Tinaphong | 320/108 |
| 2002/0087724 A1 | 7/2002 | Datta et al. | |
| 2003/0185233 A1 | 10/2003 | Ji et al. | |
| 2003/0233450 A1 | 12/2003 | Carley | |
| 2005/0091360 A1 | 4/2005 | Chen et al. | |
| 2005/0108519 A1 | 5/2005 | Barton et al. | |
| 2005/0149924 A1 | 7/2005 | Komarla et al. | |
| 2005/0188070 A1 | 8/2005 | Tripathi et al. | |
| 2005/0257040 A1 | 11/2005 | Choi et al. | |
| 2007/0002826 A1 | 1/2007 | Bennett et al. | |
| 2008/0021978 A1 | 1/2008 | Maynard et al. | |
| 2008/0037553 A1 | 2/2008 | Gilmartin et al. | |
| 2008/0184022 A1 | 7/2008 | Peacock | |
| 2009/0102296 A1* | 4/2009 | Greene et al. | 307/149 |
| 2009/0282284 A1 | 11/2009 | Naohiro et al. | |
| 2010/0005283 A1 | 1/2010 | Ha | |
| 2010/0090656 A1* | 4/2010 | Shearer et al. | 320/139 |
| 2010/0115253 A1 | 5/2010 | Lipsky et al. | |
| 2010/0180031 A1 | 7/2010 | Cacheria et al. | |
| 2011/0055824 A1 | 3/2011 | Benari | |
| 2011/0202983 A1 | 8/2011 | Pope et al. | |
| 2011/0276625 A1 | 11/2011 | Shah | |
| 2011/0292807 A1 | 12/2011 | Shah et al. | |
| 2011/0296130 A1 | 12/2011 | Abe et al. | |

* cited by examiner

*Primary Examiner* — Richard V Muralidar
(74) *Attorney, Agent, or Firm* — Morris, Manning & Martin, LLP; Tim Tingkang Xia, Esq.

(57) ABSTRACT

In one aspect, the a system for charging an electrical storage device of a computer is disclosed. In one embodiment, the system includes at least one user input device that is operatively connected to the computer and configured to communicate input data to the computer in response to an action of a user. The input device has one or more transducers that are configured to receive a mechanical force resulting from user input to the input device and to convert the received mechanical force into electrical energy. The input device also has a connector that is configured to operatively connect the user input device to the electrical storage device of the computer and to deliver the electrical energy from the user input device to the electrical storage device.

20 Claims, 4 Drawing Sheets

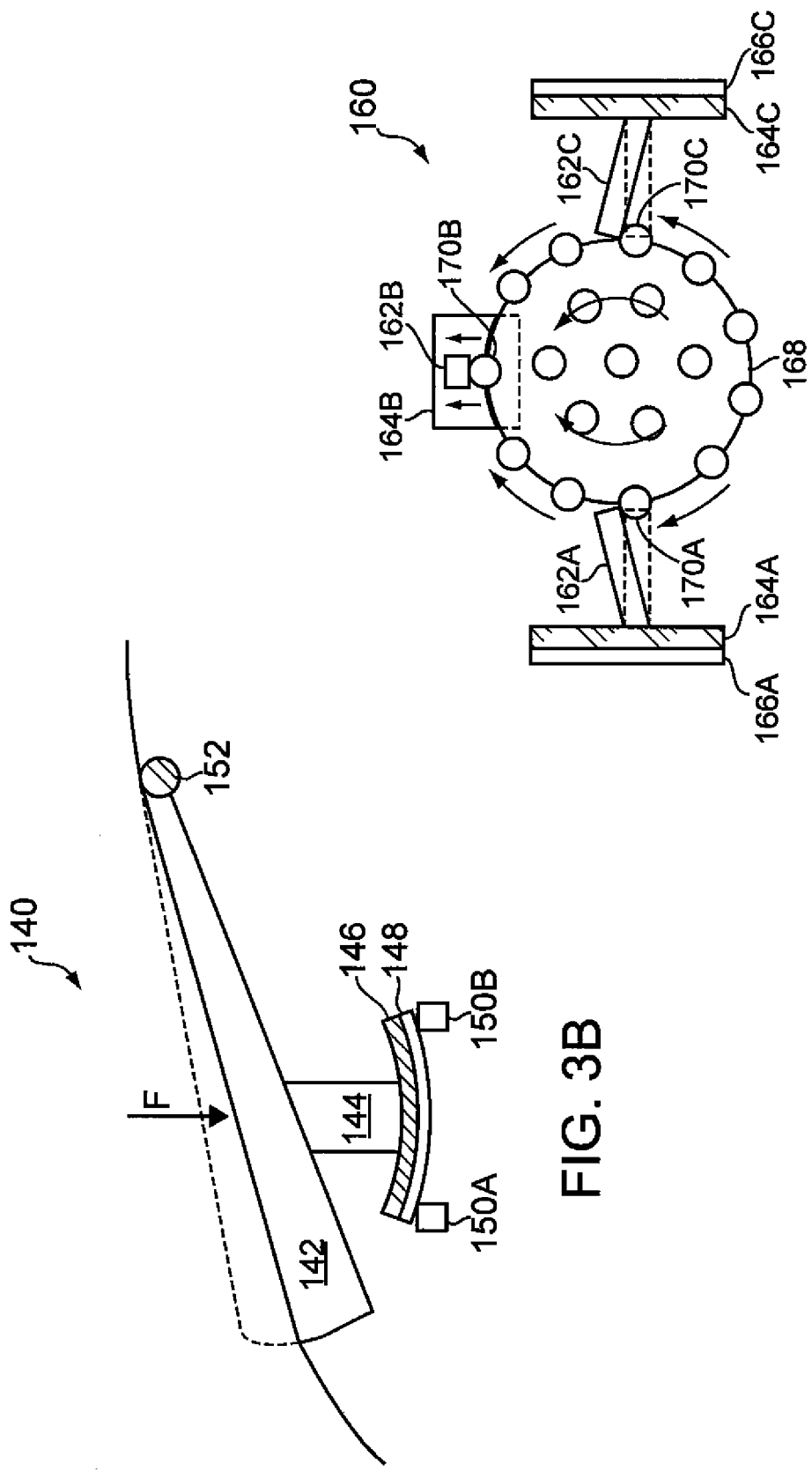

METHOD AND APPARATUS TO HARNESS KEYBOARD STROKES AND MOUSE MOVEMENT TO CHARGE AN ELECTRICAL STORAGE DEVICE

FIELD OF THE INVENTION

The present invention relates generally to a system for charging an electrical storage device of a computer, and more particularly to a system having one or more user input devices with transducers to convert mechanical energy from the user into electrical energy and a connector to deliver the electrical energy to an electrical storage device of a computer.

BACKGROUND OF THE INVENTION

Computing systems require dependable power sources for proper operation. Portable personal computers such as "notebook" or "laptop" type computers commonly use rechargeable batteries to provide power for the computing operations when a source of externally generated power is not available, such as through an AC wall outlet. The amount of operational time that is afforded between a first battery charge and subsequent battery charge is therefore of great importance to a computer user. Peripheral input devices such as keyboards and mice are used for interactive purposes such that a user may control functional operations of the computer, and these input devices may be operatively connected to an input/output ("I/O") system of the computer through the use of various types of ports and interfaces such as a universal serial bus (USB) connection. Referring to the example of a computer keyboard and computer mouse, the computer user physically interacts with the user input devices by striking a key on a keyboard, moving a mouse, or otherwise directing a force to the devices. Peripheral input devices require electricity to facilitate the communication of data based on the user interaction. The source of the electricity for powering the input device may be generated by the battery of the personal computer. Conventionally, the mechanical energy that a user expends to physically interact with the input device has not been harnessed to provide storable electrical energy directly to the power source of the computer.

Therefore, a heretofore unaddressed need still exists in the art to address the aforementioned deficiencies and inadequacies.

SUMMARY OF THE INVENTION

In one aspect, the present invention relates to a system for charging an electrical storage device of a computer. In one embodiment, the system includes at least one user input device that is operatively connected to the computer and configured to communicate input data to the computer in response to an action of a user. The input device has one or more transducers that are configured to receive a mechanical force resulting from user input to the input device and to convert the mechanical force into electrical energy. The input device also has a connector that is configured to operatively connect the user input device to the electrical storage device of the computer and to deliver the electrical energy from the user input device to the electrical storage device. The connector is further configured to communicate the input data to the computer.

In one embodiment, the user input device is configured such that an amount of electrical energy delivered to the electrical storage device from the user input device is greater than an amount of electrical energy required by the user input device to generate the input data and communicate the input data to the computer. In one embodiment, the user input device is configured to receive at least the required amount of energy from the transducer. In an alternative embodiment, the user input device is configured to receive at least the required amount of electrical energy from a source that is separate from the transducer.

In one embodiment, the electrical storage device of the computer has a rechargeable battery. The user input device includes at least one mechanically actuatable member that is configured to transfer the received mechanical force to the transducer, and in one embodiment, the user input device includes a keyboard with a plurality of keys and the actuatable member is operatively coupled to at least one of the plurality of keys.

In one embodiment, the user input device includes a ball member that is configured to rotate in response to a translational movement caused by a user. The actuatable member is operatively connected to the ball member such that rotation of the ball member causes a mechanical force to be applied to the transducer.

In another aspect, the present invention relates to a system for charging an electrical storage device of a computer. In one embodiment, the system includes a plurality of user input devices that are operatively connected to the computer. Each of the user input devices is configured to communicate input data to the computer in response to an action of a user, and each of the input devices has at least one piezoelectric element configured to receive a mechanical force and convert the mechanical force into electrical energy. The system further includes at least one connector that is configured to operatively connect a corresponding input device to the electrical storage device of the computer and to deliver the electrical energy from the respective user input device to the electrical storage device. The connector is further configured to communicate the input data to the computer. In one embodiment, the electrical storage device includes a rechargeable battery.

In one embodiment, at least one of the plurality of user input devices is configured such that an amount of electrical energy delivered to the electrical storage device from the user input device is greater than an amount of electrical energy required by the user input device to generate the input data and communicate the input data to the computer.

In one embodiment, at least one of the plurality of user input devices is configured to receive at least the required amount of electrical energy from a source that is separate from the piezoelectric element.

In one embodiment, at least one of the plurality of user input devices is configured to receive at least the required amount of energy from at least one corresponding piezoelectric element.

In one embodiment, each of the plurality of user input devices has at least one mechanically actuatable member that is configured to provide the received mechanical force to the piezoelectric element.

In one embodiment, at least one of the plurality of user input devices includes a keyboard with a plurality of keys, and the actuatable member is operatively coupled to at least one of the plurality of keys.

In one embodiment, at least one of the plurality of user input devices comprises a ball member that is configured to rotate in response to a translational movement caused by a user, and the actuatable member is operatively connected to the ball member such that rotation of the ball member causes a mechanical force to be applied to the piezoelectric element.

In yet another aspect, the present invention relates to a system for charging an electrical storage means of a computing means. In one embodiment, the system includes at least one user input means that is operatively connected to the computing means, for communicating input data to the computing means in response to an action of a user. The system also includes at least one energy conversion means for receiving a mechanical force and converting the received mechanical force into electrical energy. The system further includes a connection means for operatively connecting the user input means to the electrical storage means and delivering the electrical energy from the user input means to the electrical storage means. In one embodiment, an amount of electrical energy delivered to the electrical storage means from the user input means is greater than an amount of electrical energy required by the user input means to generate the input data and communicate the input data to the computing means.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIG. 3B schematically shows an enlarged, cross-sectional side view of a first type of transducer in the user input device illustrated in FIG. 3A, according to one embodiment of the present invention; and FIG. 3C schematically shows an enlarged, cross-sectional side view of a second type of transducer in the input device illustrated in FIG. 3A, according to one embodiment of the present invention.

DETAILED DESCRIPTION OF THE INVENTION

Figure 1:
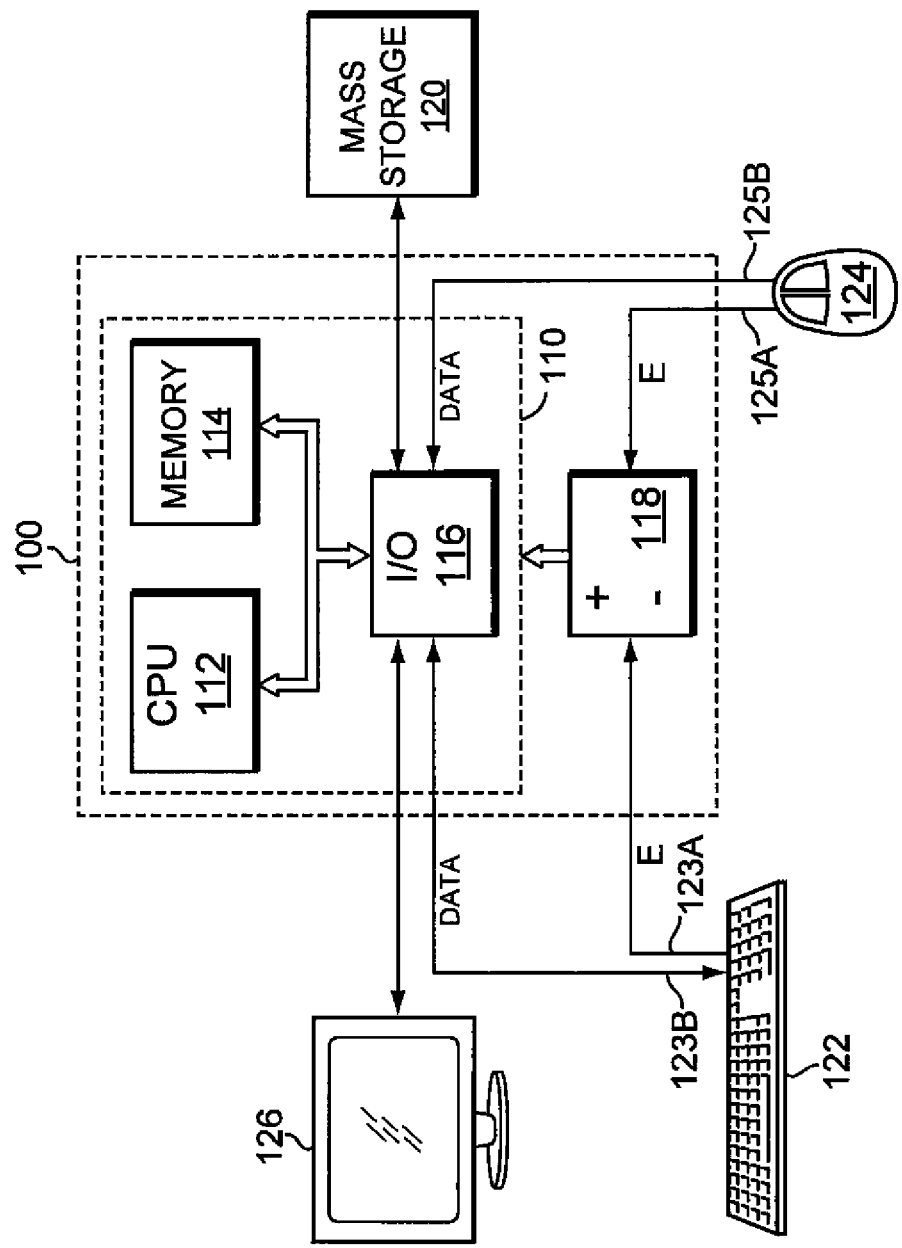
FIG. 1 schematically shows a computing system with user input devices for charging an electrical storage device, according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments in conjunction with the accompanying drawings in FIGS. 1-3. Now referring to FIG. 1, a computing system 100 is shown. The computing system includes a central processing unit (CPU) 112, system memory 114, and input/output (I/O) interface 110 for connecting to peripheral devices. As shown, the CPU 112, system memory 114, and I/O interface 110 collectively form a group of operatively connected computing components 110, which may be referred to as a "baseboard" of the computing system 100. The computing components on the baseboard are electrically powered by an electrical storage device 118. In the embodiment shown in FIG. 1, the electrical storage device 118 includes a portable rechargeable battery. A graphic display device 126 and a mass storage device 120 for storing data are operatively connected to the I/O interface 116. Two user input devices 122 and 124 are operatively connected to the I/O interface 116. In the embodiment shown in FIG. 1, a first user input device 122 includes a keyboard having a plurality of keys, and a second user input device 124 has substantially the form of a computer mouse.

As shown in FIG. 1, the first user input device 122 is operatively connected to the I/O interface 116 via a connector 123B that is operative to communicate data ("DATA") between the baseboard 110 and the first user input device 122. As commonly known in the art, a standard QWERTY type keyboard is operative to receive mechanical force from a user and generate specific input data based on the physical interactions with the user. For example, when a user strikes a "Q" key, a mechanical force is applied by the user's finger in a substantially vertical direction, and the keyboard contains circuitry that is configured to, in response, generate data indicating that a "Q" input has been received and communicate the data to a baseboard.

According to various embodiments of the present invention, the first user input device 122 and the second user input device 124 are electrically connected to the electrical storage device 118 such that each is operative to provide electrical energy ("E") to be stored in the electrical storage device 118. For purposes of consistency and clarity, the term "electrical energy" or ("E") is used herein to collectively refer to various well known principles relating to electricity as it pertains to embodiments of the present invention, for example electrical power as a function of current and voltage, creation and collection of electrical charge, and storage of electrical charge and associated voltage.

As further discussed below with reference to FIGS. 2A-2C, the first user input device 122 includes one or more transducers that are configured to convert mechanical force received from the physical interaction of the user into electrical energy. Accordingly, as one example, a user strikes the keys of the keyboard in accordance with normal user-computer interaction and each strike of the key has an associated amount of electrical energy produced via the transducer. The electrical energy is then delivered from the first input device 122 to the electrical storage means 118, via the connector 123A, to thereby provide a charge and effectively provide a portion of the storable electricity that is needed by the components on the baseboard 110 to properly perform computing functions.

The connector 123B which is configured for communicating data, and the connector 123A which is configured to deliver electrical energy, may be grouped together and routed through a single, standard type of computing cable for at least a portion of the connection segment between the keyboard elements to the computing system 100. For example, a universal serial bus (USB) cable, as commonly used to connect peripheral devices to a computing system, may be configured to accommodate communication of both the data and the electrical energy to one or more different locations of the computing system 100. Alternatively, the connector 123A and connector 123B may be separated and routed through distinct cords or cables such that the connector 123A directly delivers electrical energy to the electrical storage means and the connector 123B directly communicates data to the baseboard 110. Those skilled in the art will appreciate that one or more intermediate charge storing devices such as capacitors or super capacitors may be employed to accumulate multiple smaller segments of charge, for example, an amount of electrical energy formed from 20 key strikes of a keyboard, before then discharging and delivering the collected electrical energy to the electrical storage device 118.

Figure 2A:
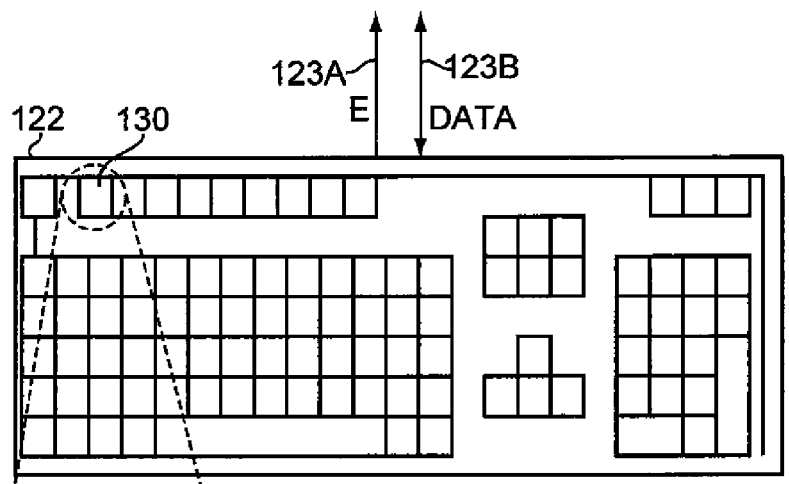
FIG. 2A schematically shows a partial, top view of a first type of user input device for charging an electrical storage device in a computing system, having a keyboard with a plurality of keys, according to one embodiment of the present invention.
Figure 2B:
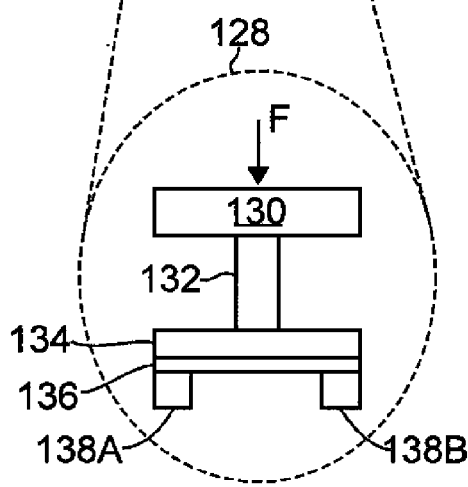
FIG. 2B schematically shows an enlarged, cross-sectional side view of one of the plurality of keys of the keyboard illustrated in FIG. 2A in a first position, according to one embodiment of the present invention.
Figure 2C:
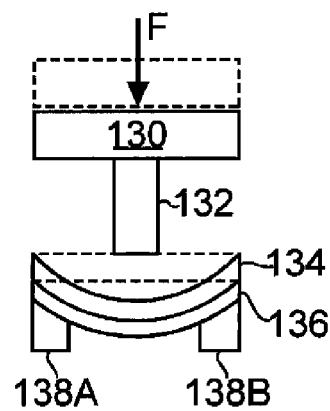
FIG. 2C schematically shows a cross-sectional side view of the key illustrated in FIG. 2A in a second position, according to one embodiment of the present invention.

Now referring specifically to FIGS. 2A-2C, FIG. 2A shows the first input device 122 as discussed above with reference to FIG. 1, with one key 130 of the plurality of keys shown in an enlarged, cross-sectional side view in FIGS. 2B and 2C. As shown in FIG. 2B, element 130 represents the top portion of a transducer assembly 128. The top portion 130 is physically attached to an actuatable member 132, shown here substantially in the form of a stem. One end of the actuatable member 132 is operatively coupled with a piezoelectric element 134 on top of a layer of conductive material 136. As commonly known in the art, a piezoelectric material which may take the form of a crystal or other structure, responds to a mechanical strain on the structural composition of the material that is caused by an externally applied physical pressure by generating electrical energy through a mechanism known as the piezoelectric effect. As shown in FIG. 2, the mechanical force applied by the user through the actuatable member 132 translates into a mechanical strain placed on the piezoelectric material 134, and the mechanical strain is sufficient to cause the piezoelectric material 134 to generate the electrical response, that is, to produce the electrical energy that is to be delivered to the electrical storage device 118 in accordance with various embodiments of the present invention.

Those skilled in the art will appreciate that piezoelectric elements may be formed into shapes other than the substantially planar segments shown for exemplary purposes in FIG. 2B, and that alternative configurations of using a mechanically applied force to cause mechanical strain in a piezoelectric element are within the scope of the invention. As shown in the embodiment of FIG. 2, contacts 138A and 138B may be configured to serve as dual fulcrum elements for allowing the piezoelectric element 134 to deform in a particular directional orientation in response to an applied force F. FIG. 2B shows the transducer assembly 128 in a first position corresponding to a state of a key when it is not receiving an applied force from the user's finger. FIG. 2C shows the transducer assembly 128 in a second position, wherein a mechanical force F is being applied in a substantially vertical direction such that the force is transferred to the piezoelectric element 134, which physically deforms in response. The conductive material 136 is shown as substantially flexible and planar, however those skilled in the art will appreciate that conductive materials and elements may be attached and utilized in connection with piezoelectric materials in various alternative configurations without departing from the scope of the invention.

Figure 3A:
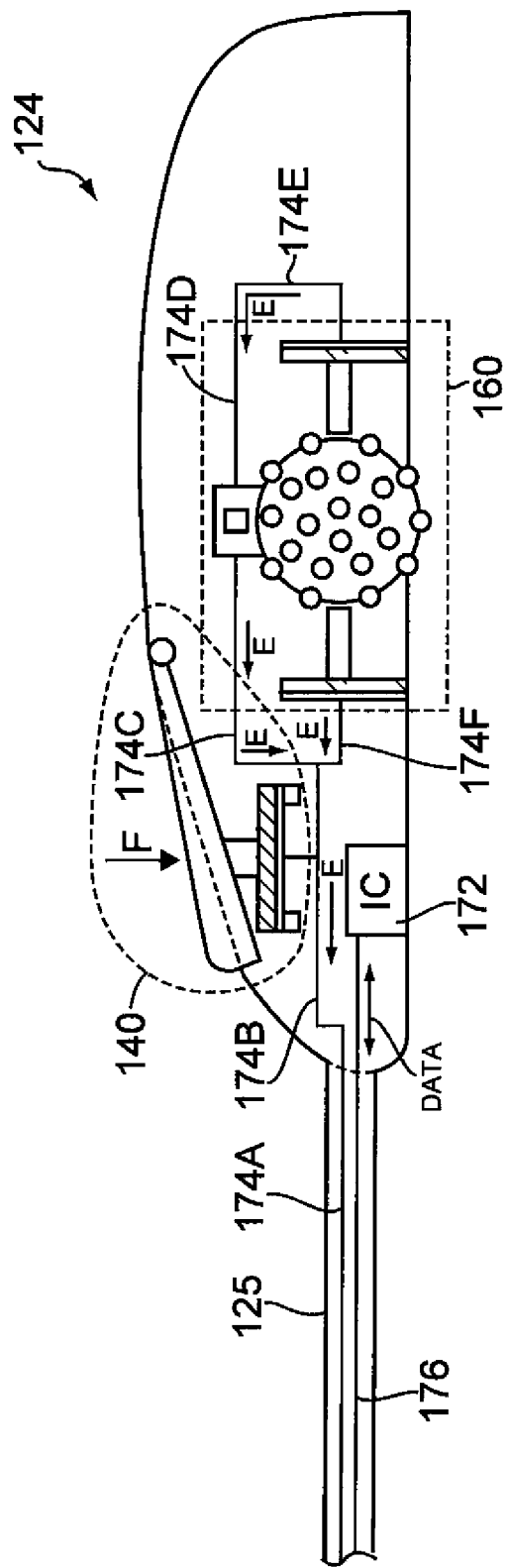
FIG. 3A schematically shows a cross-sectional side view of a second type of user input device for charging an electrical storage device in a computing system, according to one embodiment of the present invention.

FIG. 3A shows a cross-sectional side view of the second input device 124. A connector 125 represents a single cable enclosure that encompasses both a data communication line 174 and electrical line 176. Referring again to FIG. 1, according to various embodiments of the present invention, the data communication line 174A, 174B may form all or a portion of the connector 123B, and the electrical line 176 may form all or a portion of the connector 123A. Control circuitry 172 in the form of an integrated circuit (IC) is shown in FIG. 3A, which is operative to receive data from the baseboard 110 of the computing system 100 through data communication line 174, and is further operative to generate input data based on mechanical interactions with a user of the input device 124. Second and third types of transducer assemblies 140 and 160, respectively, are shown as being electrically connected to the electrical line 174 through various segments of circuitry 174A-174F, for example conductive traces, configured for transmitting the electrical energy E out from the user input device to be delivered to the electrical storage device 118 of the computing system 100.

FIG. 3B shows an enlarged, cross-sectional side view of the transducer assembly 140 shown in FIG. 3A. The transducer assembly 140 includes a hinged actuator in the form of a click-able top-mounted mouse button 142, hinged to rotate and, in response to an applied mechanical force, cause a stem-type actuatable member 144 to be forced in a substantially vertical, downward direction and thereby apply physical pressure on a piezoelectric element 146 such as to deform the piezoelectric element 146 and, via mechanical strain and through the piezoelectric effect, generate electrical energy E. A substantially flexible conductor layer 148 and contacts 150A, 150B are shown in FIG. 3B and serve the functions described above with reference to FIG. 2.

FIG. 3C shows an enlarged, cross-sectional side view of the transducer assembly 160 shown in FIG. 3A. The transducer assembly 160 includes a rotatable ball member 168. Peripheral input devices commonly use rotating spherical members, sometimes referred to as tracking balls, to generate input data in response to physical interaction with a computer user, such as when a user moves his or her hand in a directional orientation that is substantially parallel to the plane on which the input device rests, for example, across a mouse pad on a desk, such as to cause the tracking ball to rotate. According to various embodiments of the present invention, a plurality of small raised surface members, including members 170A, 170B, 170C, and 170D extend from the spherical surface of the ball member 168 such that, when the ball member 168 is caused to rotate, the actuatable arm member 162 is displaced by the raised member 170, and then the arm member 162 returns to its original position once the raised member has rotated past the path of the actuatable member 162. That is, each actuatable arm member 162 is arranged in relation to the rotating ball member such that when a raised member 170 rotates in a path that collides with at least a portion of the arm member 162, the arm member is physically displaced until the raised member 170 passes. As shown, each respective actuatable arm member 162A-162C is physically coupled to a corresponding piezoelectric element 164A-164C such that when displaced, the piezoelectric element 164A-164C undergoes a mechanical strain sufficient to generate electrical energy through the piezoelectric effect, which is then delivered to the electrical storage device 118 of the computing system 100 as shown in FIG. 1. As discussed above with reference to FIG. 2, conductor layers 166A-166C are formed in contact with the piezoelectric elements 164A-164C.

Now referring to FIGS. 1-3, in one aspect, the present invention relates to a system for charging an electrical storage device 118 of a computer 100. In one embodiment, the system includes at least one user input device 122, 124 that is operatively connected to the computer 100 and configured to communicate input data ("DATA") to the computer 100 in response to an action of a user. The input device 122, 124 has at least one transducer (128 for input device 122; 140 and 160 for input device 124) configured to receive a mechanical force ("F") and convert the mechanical force F into electrical energy ("E"). The system also includes a connector (123 for input device 122; 125 for input device 124) configured to operatively connect the user input device 122, 124 to the electrical storage device 118 of the computer 100 and to deliver the electrical energy E from the user input device 122, 124 to the electrical storage device 118.

In one embodiment, the user input device 122, 124 is configured such that an amount of electrical energy delivered to the electrical storage device 118 from the user input device 122, 124 is greater than an amount of electrical energy required by the user input device 122, 124 to generate the input data and communicate the input data to the computer 100.

In one embodiment, the user input device 122, 124 is configured to receive at least the required amount of electrical energy from a source (electrical storage means 118) that is separate from the transducer (128 for input device 122; 140 and 160 for input device 124).

In one embodiment, the user input device 122, 124 is configured to receive at least the required amount of energy from the transducer (128 for input device 122; 140 and 160 for input device 124).

In one embodiment, the connector (123 for input device 122; 125 for input device 124) is further configured to communicate the input data to the computer 100.

In one embodiment, the electrical storage device 118 includes a rechargeable battery.

In one embodiment, the user input device 122, 124 includes at least one mechanically actuatable member (132 for input device 122; (142, 144, 152) and (162A, 162B, 162C) for input device 124) that is configured to provide the received mechanical force to the transducer (128 for input device 122; 140 and 160 for input device 124). In one embodiment, the user input device 122 includes a keyboard with a plurality of keys 130 and the actuatable member 132 is operatively coupled to at least one of the plurality of keys 130.

In one embodiment, the user input device 124 comprises a ball member 168 that is configured to rotate in response to a translational movement, and the actuatable member 162A, 162B, 162C is operatively connected to the ball member 168 such that rotation of the ball member 168 causes a mechanical force to be applied to the transducer 160.

In another aspect, the present invention relates to a system for charging an electrical storage device 118 of a computer 100. In one embodiment, the system includes a plurality of user input devices 122, 124 that are operatively connected to the computer 100. Each of the user input devices 122, 124 is configured to communicate input data to the computer 100 in response to an action of a user, and each includes at least one piezoelectric element (134 for input device 122; 146 and 164A, 164B, 164C for input device 124) configured to receive a mechanical force and convert the mechanical force into electrical energy. The system further includes at least one connector (123 for input device 122; 125 for input device 124) configured to operatively connect a corresponding at least one of the plurality of user input devices 122, 124 to the electrical storage device 118 of the computer 100 and deliver the electrical energy E from the respective user input device 122, 124 to the electrical storage device 118.

In one embodiment, at least one of the plurality of user input devices 122, 124 is configured such that an amount of electrical energy delivered to the electrical storage device 118 from the user input device 122, 124 is greater than an amount of electrical energy required by the user input device 122, 124 to generate the input data and communicate the input data to the computer 100.

In one embodiment, at least one of the plurality of user input devices 122, 124 is configured to receive at least the required amount of electrical energy from a source (electrical storage means 118) that is separate from the piezoelectric element (134 for input device 122; 146 and 164A, 164B, 164C for input device 124).

In one embodiment, at least one of the plurality of user input devices 122, 124 is configured to receive at least the required amount of energy from at least one corresponding piezoelectric element (134 for input device 122; 146 and 164A, 164B, 164C for input device 124).

In one embodiment, the connector 123, 125 is further configured to communicate the input data to the computer 100.

In one embodiment, the electrical storage device 118 includes a rechargeable battery.

In one embodiment, each of the plurality of user input devices 122, 124 comprises at least one mechanically actuatable member (132 for input device 122; (142, 144, 152) and (162A, 162B, 162C) for input device 124) configured to provide the received mechanical force to the piezoelectric element (134 for input device 122; 146 and 164A, 164B, 164C for input device 124).

In one embodiment, at least one of the plurality of user input devices 122, 124 has a keyboard 122 with a plurality of keys 130 and the actuatable member 132 is operatively coupled to at least one of the plurality of keys 130.

In one embodiment, at least one of the plurality of user input devices 122, 124 includes a ball member 168 configured to rotate in response to a translational movement, and the actuatable member 162A, 162B, 162C is operatively connected to the ball member 168 such that rotation of the ball member 168 causes a mechanical force to be applied to the piezoelectric element 164A, 164B, 164C.

In yet another aspect, the present invention relates to a system for charging an electrical storage means 118 of a computing means 100. In one embodiment, the system includes at least one user input means 122, 124 that is operatively connected to the computing means 100, for communicating input data to the computing means 100 in response to an action of a user, having at least one energy conversion means (128 for input device 122; 140 and 160 for input device 124) for receiving a mechanical force and converting the received mechanical force into electrical energy. The system further includes a connection means (123 for input means 122; 125 for input means 124) for operatively connecting the user input means 122, 124 to the electrical storage means 118 and delivering the electrical energy from the user input means 122, 124 to the electrical storage means 118.

In one embodiment, the user input means 122, 124 is configured such that an amount of electrical energy delivered to the electrical storage means 118 from the user input means 122, 124 is greater than an amount of electrical energy required by the user input means 122, 124 to generate the input data and communicate the input data to the computing means 100.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A system for charging an electrical storage device of a computer, comprising:
   at least one user input device operatively connected to the computer and configured to communicate input data to the computer in response to an action of a user, having at least one transducer configured to receive a mechanical force and convert the mechanical force into electrical energy; and
   a connector, configured to operatively connect the user input device to the electrical storage device of the computer and deliver the electrical energy from the user input device to the electrical storage device.

2. The system of claim 1, wherein the user input device is configured such that an amount of electrical energy delivered to the electrical storage device from the user input device is greater than an amount of electrical energy required by the user input device to generate the input data and communicate the input data to the computer.

3. The system of claim 2, wherein the user input device is configured to receive at least the required amount of electrical energy from a source separate from the transducer.

4. The system of claim 2, wherein the user input device is configured to receive at least the required amount of energy from the transducer.

5. The system of claim 1, wherein the connector is further configured to communicate the input data to the computer.

6. The system of claim 1, wherein the electrical storage device comprises a rechargeable battery.

7. The system of claim 1, wherein the user input device comprises at least one mechanically actuatable member for input device configured to provide the received mechanical force to the transducer.

8. The system of claim 7, wherein the user input device comprises a keyboard having a plurality of keys and the actuatable member is operatively coupled to at least one of the plurality of keys.

9. The system of claim 7, wherein the user input device comprises a ball member configured to rotate in response to a translational movement and the actuatable member is operatively connected to the ball member such that rotation of the ball member causes a mechanical force to be applied to the transducer.

10. A system for charging an electrical storage device of a computer, comprising:
    a plurality of user input devices operatively connected to the computer, each configured to communicate input data to the computer in response to an action of a user and each having at least one piezoelectric element configured to receive a mechanical force and convert the mechanical force into electrical energy; and
    at least one connector configured to operatively connect a corresponding at least one of the plurality of user input devices to the electrical storage device of the computer and deliver the electrical energy from the respective user input device to the electrical storage device.

11. The system of claim 10, wherein at least one of the plurality of user input devices is configured such that an amount of electrical energy delivered to the electrical storage device from the user input device is greater than an amount of electrical energy required by the user input device to generate the input data and communicate the input data to the computer.

12. The system of claim 11, wherein at least one of the plurality of user input devices is configured to receive at least the required amount of electrical energy from a source separate from the piezoelectric element.

13. The system of claim 11, wherein at least one of the plurality of user input devices is configured to receive at least the required amount of energy from at least one corresponding piezoelectric element.

14. The system of claim 10, wherein the at least one connector is further configured to communicate the input data to the computer.

15. The system of claim 10, wherein the electrical storage device comprises a rechargeable battery.

16. The system of claim 10, wherein each of the plurality of user input devices comprises at least one mechanically actuatable member configured to provide the received mechanical force to the piezoelectric element.

17. The system of claim 16, wherein at least one of the plurality of user input devices comprises a keyboard having a plurality of keys and the actuatable member is operatively coupled to at least one of the plurality of keys.

18. The system of claim 16, wherein at least one of the plurality of user input devices comprises a ball member configured to rotate in response to a translational movement and the actuatable member is operatively connected to the ball member such that rotation of the ball member causes a mechanical force to be applied to the piezoelectric element.

19. A system for charging an electrical storage means of a computing means, comprising:
    at least one user input means operatively connected to the computing means, for communicating input data to the computing means in response to an action of a user, having at least one energy conversion means for receiving a mechanical force and converting the received mechanical force into electrical energy; and
    a connection means for operatively connecting the user input means to the electrical storage means and delivering the electrical energy from the user input means to the electrical storage means.

20. The system of claim 19, wherein the user input means is configured such that an amount of electrical energy delivered to the electrical storage means from the user input means is greater than an amount of electrical energy required by the user input means to generate the input data and communicate the input data to the computing means.

* * * * *